(12) United States Patent
Kawamura

(10) Patent No.: US 8,673,829 B2
(45) Date of Patent: Mar. 18, 2014

(54) GREASE COMPOSITION AND GREASE COMPOSITION-ENCLOSED ROLLING BEARING AND UNIVERSAL JOINT

(75) Inventor: Takayuki Kawamura, Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 12/737,809

(22) PCT Filed: Sep. 3, 2009

(86) PCT No.: PCT/JP2009/065417
§ 371 (c)(1),
(2), (4) Date: Feb. 16, 2011

(87) PCT Pub. No.: WO2010/027019
PCT Pub. Date: Mar. 11, 2010

(65) Prior Publication Data
US 2011/0136578 A1    Jun. 9, 2011

(30) Foreign Application Priority Data

Sep. 5, 2008  (JP) ................................ 2008-228975
Sep. 5, 2008  (JP) ................................ 2008-229010

(51) Int. Cl.
*C10M 169/04*   (2006.01)
(52) U.S. Cl.
USPC ............ 508/110; 508/421; 508/435; 508/469
(58) Field of Classification Search
USPC ................... 508/110, 421, 435, 469
See application file for complete search history.

(56) References Cited

U.S. PATENT DOCUMENTS

2006/0122079 A1    6/2006  Kaneshige et al.
2007/0154128 A1*   7/2007  Mikami ..................... 384/627
(Continued)

FOREIGN PATENT DOCUMENTS

CN    1711344       12/2005
CN    1918269 A     2/2007
(Continued)

OTHER PUBLICATIONS

Machine translation of Obara et al., JP 2003165988 A, Jun. 2003.*

(Continued)

*Primary Examiner* — Taiwo Oladapo
(74) *Attorney, Agent, or Firm* — Hedman & Costigan, P.C.; James V. Costigan; Kathleen A. Costigan

(57) ABSTRACT

It is an object of the present invention to provide a grease composition (7) which can be used for a long term in a wide temperature range from low to high temperatures by using comparatively inexpensive base oil. It is another object of the present invention to provide a rolling bearing and a universal joint in which the grease composition (7) is enclosed. The grease composition (7) is composed of base grease, consisting of base oil and a thickener, to which an additive is added. The base oil contains not less than 50 wt % of highly refined oil having a viscosity index of 120 to 180. The additive contains at least ZnDTP and 0.2 to 6 parts by weight of poly (metha) acrylate having a kinematic viscosity of not less than 100 mm$^2$/s and less than 850 mm$^2$/s at 100° C. for 100 parts by weight of the base grease. The grease composition (7) is enclosed in the circumferences of rolling elements (4) of a rolling bearing (1).

17 Claims, 8 Drawing Sheets

(56) References Cited

U.S. PATENT DOCUMENTS

| | | |
|---|---|---|
| 2008/0026970 A1 | 1/2008 | Wright |
| 2008/0166080 A1* | 7/2008 | Kawamura .................. 384/462 |
| 2009/0003742 A1 | 1/2009 | Nakatani et al. |

FOREIGN PATENT DOCUMENTS

| | | |
|---|---|---|
| CN | 101107347 | 1/2008 |
| CN | 101495607 | 7/2009 |
| EP | 0 435 745 | 12/1990 |
| EP | 1 561 798 | 8/2005 |
| EP | 1 847 586 | 10/2007 |
| EP | 2 053 117 | 4/2009 |
| JP | 60-231796 | 11/1985 |
| JP | 63-26789 | 5/1988 |
| JP | 02-232297 | 9/1990 |
| JP | 04-130193 | 5/1992 |
| JP | 04-293999 | 10/1992 |
| JP | 07-268372 | 10/1995 |
| JP | 10-017884 | 1/1998 |
| JP | 10-273692 | 10/1998 |
| JP | 2002-356693 | 12/2002 |
| JP | 2003-105365 | 4/2003 |
| JP | 2003-165988 | 6/2003 |
| JP | 2006-342260 | 12/2006 |
| JP | 2008-069282 | 3/2008 |
| JP | 2008-111514 | 5/2008 |
| JP | 2008-111515 | 5/2008 |
| JP | 2008-156527 | 7/2008 |
| KR | 10-2009-0050051 | 5/2009 |
| WO | WO 2004/044108 | 5/2004 |
| WO | WO 2006/078035 | 7/2006 |
| WO | WO 2006101206 A1 * | 9/2006 |
| WO | WO 2008-016038 | 2/2008 |
| WO | WO 2008050003 A2 * | 5/2008 |

OTHER PUBLICATIONS

PCT Search Report dated Nov. 18, 2009.

* cited by examiner

GREASE COMPOSITION AND GREASE COMPOSITION-ENCLOSED ROLLING BEARING AND UNIVERSAL JOINT

TECHNICAL FIELD

The present invention relates to a grease composition enclosed in a rolling bearing and a universal joint incorporated in various industrial machines, vehicles and the like, and more particularly to a grease composition used for the rolling bearing and the universal joint used at a high rotational speed in a wide temperature range from very low temperatures to high temperatures.

BACKGROUND ART

The grease composition is widely used to lubricate various machines such as cars, electrical equipment, construction machines, machine tools, and the like. Machines are becoming more compact, more lightweight, and have increasingly high performance year by year. Of these machines, an electric motor and the like have become compact and are rotated at a high rotational speed and in addition composed of a large number of parts intensively disposed, which leads to the rise of the atmospheric temperature. Therefore the lubricating conditions of grease used for bearings of the electric motor and the like are increasingly severe. In consideration of the above-described situation, improvement of the life of the grease at high temperatures greatly contributes to the improvement of the quality and reliability of machines and is thus very important.

There are some methods of lengthening the life of the grease. A first method is to improve thermal stability by effectively adding a proper antioxidant to the grease. For example, grease using an alkylthio-1,3,5-triazine compound excellent in thermal stability was proposed (see patent document 1). A second method is to obtain grease having a long life by selecting the thickener excellent in heat resistance. For example, there is proposed grease excellent in its thermal stability developed owing to the finding of a urea compound excellent in its heat resistance (see patent documents 2 and 3).

A third method is to use synthetic lubricants excellent in the thermal stability thereof as the base oil of grease or obtain grease having a long life by combining them with each other. It is well known that by using apart or all of synthetic lubricants (for example, poly-α-olefin, diphenyl ether, diester, polyol ester, silicone, fluorinated oil) known for its favorable thermal stability as the base oil of the grease, the heat resistance of the grease is improved and its life can be lengthened.

In a very cold region, to start a car at a very low temperature is considered. When a pulley and the like of equipment driven by an engine of the car is operated in this condition, there is a case where in dependence on a specification and an operation condition, an abnormal sound (whistling), a so-called cold-time abnormal sound is generated. Although the cause of the generation of the cold-time abnormal sound has not yet been clearly elucidated, it is conceivable that the pulley and the like resonate owing to self-excited vibration of a rolling element caused by uneven oil film of grease, and an outer ring axially oscillates (translational motion) to generate the cold-time abnormal sound.

In recent years, cars have high performance, and high-power cars have increased. Thus a load is increasingly applied to a constant-velocity joint (constant-velocity universal joint), and the lubricating condition thereof tends to become more severe. There is a tendency that cars are demanded to give a good ride to a higher extent. It is necessary to make a driver feel comfortable than ever in regions of all climates ranging from a very hot region to a very cold region. When the constant-velocity joint rotates in such a condition, there is a case in which a rotation resistance fluctuates owing to a difference among parts composing the constant-velocity joint. When the rotation resistance fluctuates, there is a case in which a stick slip sound is generated, which is a factor causing the driver to feel less comfortable. Grease containing mineral oil as its base oil and a molybdenum compound as its additive was heretofore disclosed (for example, see patent documents 4 and 5).

Trailers and freight trains transport cargos over a long distance. These vehicles travel between remote locations from a very hot area to a very cold area at high speeds for a long time with the vehicles being subjected to a wide temperature change accompanied by a climate change. In these vehicles, fretting is liable to occur on a rolling surface of a bearing owing to micro vibrations which occur during transport. In very cold regions, because grease hardens, lubricating oil cannot be sufficiently supplied to the rolling surface. Thus the rolling surface suffers greatly from the fretting.

Because a main shaft-supporting bearing wind power generation-is-operated in environment where the di-reaction of a wind and the velocity thereof constantly fluctuate, a load to be applied to the bearing fluctuates owing to fluctuations in the velocity thereof. As a result, a flange wears owing to a reciprocating sliding motion, and the fretting tends to occur on the rolling surface of the bearing. In wind power generators installed on mountains and in very cold regions and subjected to a very low temperature, grease hardens, and the lubricating oil cannot be sufficiently supplied to the rolling surface. Thus the rolling surface suffers greatly from the fretting.

Various methods have been proposed to prevent the occurrence of the fretting. In one of these proposed methods, a method of preventing the fretting by selecting an appropriate lubricant has been proposed. According to the description of the above-described fretting prevention method, the grease in which at least one substance selected from among oxidized paraffin, diphenylhydrogen phosphite, and hexamethylphosphoric triamide is added to the urea-based thickener has fretting prevention property (see patent document 6).

In a hub bearing for a car for rotatably supporting wheels thereof, carbon steel for machine structural use such as S53C which has a good forgeability and is inexpensive is used in a second generation hub bearing (-GEN 2) and a third-generation hub bearing (GEN 3) provided with a flange on the outer ring thereof. In the carbon steel for machine structural use, by subjecting the raceway to high frequency heat treatment, the rolling fatigue strength of the bearing portion is secured. Because the carbon steel for machine structural use contains a small amount of an alloy component, it has a weak surface strength and is inferior to bearing steel in its resistance to peeling of grease arising from the surface of the bearing. As a measure for solving the above-described problem of the carbon steel for machine structural use, grease (see patent document 7) containing zinc dithiocarbamate added to its base oil as its essential component is known.

PRIOR-ART TECHNICAL DOCUMENT

Patent Document

Patent document 1: Japanese Patent Application Laid-Open No. 4-293999
Patent document 2: Japanese Patent Application Laid-Open No. 63-26798

Patent document 3: Japanese Patent Application Laid-Open No. 63-26789

Patent document 4: Japanese Patent Application Laid-Open No. 10-273692

Patent document 5: Japanese Patent Application Laid-Open No. 2003-165988

Patent document 6: U.S. Pat. No. 2,576,898

Patent document 7: Japanese Patent Application Laid-Open No. 2006-342260

SUMMARY OF THE INVENTION

Problem to be Solved by the Invention

But in the patent documents 4 and 5, various factors at very low temperatures may cause the above-described greases to have an insufficient performance in decreasing fluctuations in the rotation resistance. Therefore the improvement of the greases for more stable performance is desired. The methods disclosed in the patent documents 1 through 3 improve thermal stability in a high-temperature region, but in a low-temperature region of a cold region, a cold-time abnormal sound may be generated. The synthetic lubricating oil used in the above-described third method is more expensive than mineral oil. Even inexpensive synthetic lubricating oil is five times higher than the mineral oil. The general-purpose synthetic lubricating oil is not less than 10 times higher than the mineral oil. The expensive synthetic lubricating oil is not less than 100 times higher than the mineral oil. Because a large amount of grease is enclosed in a rolling bearing for use in a rolling stock and a wind power generator, the cost is very high.

In addition to the heat resistance, these synthetic oils have an excellent startability at low temperatures according to a composition, thus acting very effectively in dependence on a use. But in any case, these synthetic oils do not have a life extension effect corresponding to prices. Thus the development of grease having a low cost and a long life is desired.

The grease disclosed in the patent document 6 does not have a sufficient fretting prevention performance at low temperatures in a very cold region. The grease disclosed in the patent document 7 is insufficient in its resistance to the peeling of grease arising from the surface of the bearing at low temperatures and thus has a problem that the fretting is liable to occur.

The present invention has been made to cope with the above-described problems. It is an object of the present invention to provide a grease composition which can be used for a long term in a wide temperature range from low to high temperatures by using comparatively inexpensive base oil. It is another object of the present invention to provide a rolling bearing and a universal joint in which the grease composition is enclosed.

Means for Solving the Problem

A grease composition of the present invention comprises base grease, consisting of base oil and a thickener, to which an additive is added, wherein the base oil contains not less than 50 wt % of highly refined oil having a viscosity index of 120 to 180; and the additive contains at least poly(metha)acrylate and zinc dithiophosphate (hereinafter referred to as ZnDTP); the poly(metha)acrylate has a kinematic viscosity of not less than 100 mm$^2$/s and less than 850 mm$^2$/s at 100° C.; and an addition ratio of the poly(metha)acrylate to 100 parts by weight of the base grease is 0.2 to 6 parts by weight.

The sulfur content rate of the highly refined oil is less than 0.1 wt %. The kinematic viscosity of the base oil at 40° C. is 30 to 600 mm$^2$/s. The worked penetration of the grease composition is 200 to 400.

The thickener is a urea-based compound to be obtained by a reaction between a polyisocyanate component and a monoamine component; and the monoamine component is at least one monoamine selected from aliphatic monoamine and alicyclic monoamine.

The thickener contains lithium soap, lithium complex soap or amide lithium complex soap having amide bonds in a molecule thereof.

The additive contains a phosphate. The phosphate does not include the ZnDTP. The phosphate is tricresyl phosphate (hereinafter referred to as TCP).

The additive contains molybdenum dithiocarbamate (hereinafter referred to as MoDTC). The MoDTC is non-oil-soluble.

A rolling bearing of the present invention comprises an inner ring, an outer ring, and a plurality of rolling elements interposed between the inner ring and the outer ring, and the above-described grease composition is enclosed in circumferences of the rolling elements.

The rolling bearing is used as a hub bearing or as an axle-supporting rolling bearing for supporting the axle of a rolling stock.

The rolling bearing is used as a main shaft-supporting rolling bearing for supporting a blade-mounted main shaft in a wind power generator. The rolling elements are double-row rollers; an axial raceway surface of the outer ring and axial peripheral surfaces of the rollers are formed as spherical surfaces having an equal radius of curvature; and the peripheral surfaces of the rollers are disposed along the raceway surface of the outer ring.

In a universal joint of the present invention, a rotational torque is transmitted by engagement between track grooves and a torque transmission member provided on an outer member and an inner member; an axial movement is made by rolling of the torque transmission member along the track grooves; and the grease composition is enclosed in a circumference of the torque transmission member. The universal joint is a constant-velocity joint of a stationary type or a slide type.

Effect of the Invention

The grease composition of the present invention is composed of base grease, consisting of base oil and a thickener, to which an additive is added. The base oil contains not less than 50 wt % of highly refined oil having a viscosity index of 120 to 180. The additive contains at least ZnDTP and 0.2 to 6 parts by weight of poly(metha)acrylate having a kinematic viscosity of not less than 100 mm$^2$/s and less than 850 mm$^2$/s at 100° C. for 100 parts by weight of the base grease. Therefore the grease composition of the present invention has a longer life than ordinary mineral oil-based grease at high temperatures. In addition the grease composition of the present invention has performance greatly improved over mineral oil at low temperatures. Further because the grease composition of the present invention can be supplied at much lower costs than grease in which synthetic oil is used as the base oil, the grease composition of the present invention can be utilized widely in industry and used for various equipment.

In addition to the above-described compositions, because the grease composition of the present invention contains the phosphate as its additive, the grease composition is capable of preventing the generation of fretting in a wide temperature range from low temperatures to high temperatures and especially at very low temperatures. Therefore the rolling bearing in which the grease composition is enclosed can be preferably utilized as the hub bearing for a car for rotatably supporting wheels thereof and as the rolling bearing of a main shaft-supporting apparatus for wind power generation.

In addition to the above-described components, because the grease composition of the present invention contains the MoDTC as the additive to be added to its base grease, the grease composition is capable of decreasing fluctuations in a rotation resistance in a wide temperature range from low to high temperatures. Therefore the universal joint in which the grease composition is enclosed is capable of smoothly operating in a severe use environment such a high speed, a high load, and the like. Thus it is possible to make a driver of a car using the universal joint feel comfortable.

BEST MODE FOR CARRYING OUT THE INVENTION

Figure 1:
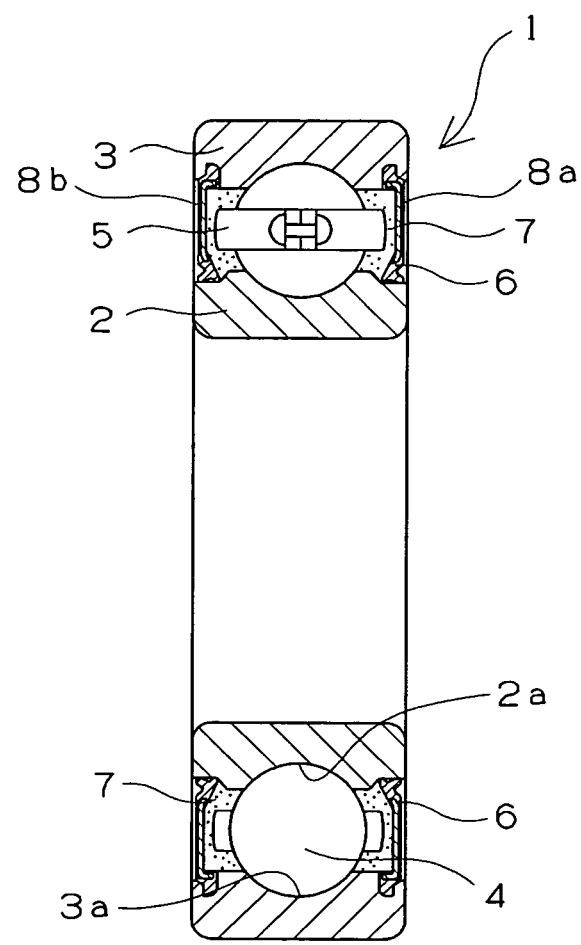
FIG. 1 is a sectional view showing a deep groove ball bearing as an example of a rolling bearing of the present invention.

The base oil which can be used for the grease composition of the present invention contains not less than 50 wt % of the highly refined oil having the viscosity index of 120 to 180. The preferable range of the viscosity index is 125 to 160. When the viscosity index is less than 120, the viscosity changes greatly owing to a temperature change, and shortage of oil film is liable to occur at high temperatures. Thus the lubrication life becomes short, and in addition the use threshold temperature becomes low. When the viscosity index exceeds 180, an oil film is insufficiently formed at high surface pressures, which is unpreferable. When the content of the highly refined oil having the viscosity index of 120 to 180 is less than 50 wt %, the grease composition has a state in which its low-temperature property and heat resistance are insufficient, which is unpreferable.

The kinematic viscosity of the base oil for use in the grease composition of the present invention is favorably 30 to 150 mm$^2$/s and more favorably 30 to 60 mm$^2$/s at 40° C. When the kinematic viscosity of the base oil at 40° C. is less than 30 mm$^2$/s, the viscosity is so low that the shortage of oil film is liable to occur and in addition a large amount of oil evaporates. On the other hand, when the kinematic viscosity of the base oil at 40° C. is more than 600 mm$^2$/s, large power loss occurs. Thus when the grease composition is used for a bearing, torque rises, and heat generation is large.

When the grease composition of the present invention is used for a universal joint, the kinematic viscosity of the base oil at 40° C. is preferably 45 to 200 mm$^2$/s. When the kinematic viscosity of the base oil at 40° C. is less than 45 mm$^2$/s, as described above, the viscosity is so low that the shortage of oil film is liable to occur and in addition a large amount of oil evaporates. On the other hand, when the kinematic viscosity of the base oil at 40° C. is more than 200 mm$^2$/s, the grease composition is inferior in its low-temperature performance and flowability. Thus the performance of rapidly supplying oil to a lubricating surface of the universal joint is impaired.

The highly refined oil to be used for the grease-composition of the present invention as its essential component is obtained by subjecting slack wax obtained from residual oil in vacuum distillation to catalytic hydrogenation thermal decomposition and synthesizing it. In addition GTL oil synthesized by Fischer-Tropsh method is exemplified as the highly refined oil. The sulfur content rate of the highly refined oil is favorably less than 0.1 wt % and more favorably less than 0.01 wt %. As products of the highly refined oil commercially available, Shell Hi-Vac Oil X46, X68 produced by Showa Shell Sekiyu K.K. are exemplified.

The base oil which can be used for the grease composition of the present invention is capable of containing paraffinic mineral oil, naphthenic oil or synthetic oil in a range less than 50 wt % for the entire base oil in addition to the above-described highly refined base oil. As the synthetic oil, poly-α-olefin, polyglycol, diphenyl ether, diester, polyol ester, and silicic acid ester are listed. Because the base oil contains not less than 50 wt % of the highly refined oil, the grease composition maintains necessary low-temperature property and the high-temperature grease life, and the mixing amount of the expensive synthetic lubricating oil can be decreased.

As the thickener which can be used for the grease composition of the present invention, soaps such as lithium soap, calcium soap, sodium soap, aluminum soap, lithium complex soap, calcium complex soap, sodium complex soap, barium complex soap, aluminum complex soap, a monourea-based compound, a diurea-based compound, a triurea-based compound, a tetraurea-based compound, a urethane-based compound, a bentonite-based compound, a clay-based compound, and a sodium terephthalate compound are listed. It is possible to use not less than one of these thickeners for the grease composition.

Of these thickeners, the urea-based thickeners (urea-based compound) which can be suitably used in a range of low to high temperatures is preferable. The urea-based compound is obtained by a reaction between a polyisocyanate component and a monoamine component.

As the polyisocyanate component, phenylenediisocyanate, tolylene diisocyanate, diphenyl diisocyanate, diphenylmethane diisocyanate, octadecane diisocyanate, decane diisocyanate, and hexane diisocyanate are listed. Of these polyisocyanate components, aromatic diisocyanate is preferable. It is possible to use polyisocyanate obtained by a reaction between diamine and diisocyanate used at a molar ratio excessive for that of the diamine. As the diamine, ethylenediamine, propanediamine, butanediamine, hexanediamine, octanediamine, phenylenediamine, tolylenediamine, xylenediamine, and diaminodiphenylmethane are listed.

As the monoamine component, it is possible to use aliphatic monoamine, alicyclic monoamine, and aromatic monoamine. As the aliphatic monoamine, hexylamine, octylamine, dodecylamine, hexadecylamine, octadecylamine, stearylamine, and oleylamine are listed. As the alicyclic monoamine, cyclohexylamine is exemplified. As the aromatic monoamine, aniline and p-toluidine are exemplified.

In the present invention, it is preferable to use at least one monoamine selected from the aliphatic monoamine and the alicyclic monoamine. It is especially preferable to use the aliphatic monoamine and the alicyclic monoamine in combination. It is difficult to thicken the highly refined base oil. But by using the urea-based thickener obtained by the reaction between the polyisocyanate component and the monoamine component selected, as described above, it is possible to improve the thickening property of the base oil and provide the base oil with lubricity excellent in a wide temperature range from low to high temperatures.

When the grease composition of the present invention is used for a rolling bearing of a main shaft-supporting apparatus for wind power generation, it is preferable to use a thickener containing (1) lithium soap, (2) lithium complex soap or (3) amide lithium complex soap having amide bonds in its molecule. The lithium soap is synthesized from lithium hydroxide and fatty acid such as aliphatic monocarboxylic acid (for example, stearic acid, 12 hydroxystearic acid). The lithium complex soap is synthesized from the lithium hydroxide, the aliphatic monocarboxylic acid, and an dibasic acid such as aliphatic dicarboxylic acid. The amide lithium complex soap has amide bonds in its molecule and is synthesized from the lithium hydroxide, fatty acid amide, and the dibasic acid. By using these thickeners, it is possible to improve an oil supply property.

The content of the thickener in the base grease of the grease composition of the present invention is 3 to 40 parts by weight. It is preferable that the base grease contains 5 to 30 parts by weight of the thickener to obtain the lubricity of the grease composition. It is favorable that the worked penetration of the grease composition of the present invention is in the range of 200 to 400. It is more favorable that the worked penetration of the grease composition is in the range of 200 to 350. When the worked penetration of the grease composition is less than 200, an oil separation degree at low temperatures is low and there is a fear that the grease composition has poor lubrication. When the worked penetration of the grease composition is more than 400, the grease is soft and there is a fear that the grease is liable to leak outside a bearing.

The poly(metha)acrylate to be used for the grease composition of the present invention is commercially available as a flow point depressant of a lubricant and required to have a kinematic viscosity not less than 100 and less than 850 mm$^2$/s. A preferable range of the kinematic viscosity thereof is 100 to 400 mm$^2$/s. As poly(metha)acrylate having the above-described requirement, methyl(metha)acrylate, ethyl(metha)acrylate, propyl(metha)acrylate, butyl(metha)acrylate, pentyl(metha)acrylate, hexyl(metha)acrylate, heptyl(metha)acrylate, octyl(metha)acrylate, nonyl(metha)acrylate, decyl(metha)acrylate, dodecyl(metha)acrylate, tetradecyl(metha)acrylate, hexadecyl(metha)acrylate, heptadecyl(metha)acrylate, and copolymers formed by arbitrarily polymerizing these poly(metha)acrylates. As products of these above-described poly(metha)acrylates, ACLUBE 132, ACLUBE 136 produced by Sanyo Chemical Industries Ltd. are listed.

The addition ratio of the poly(metha)acrylate to 100 parts by weight of the base grease is 0.2 to 6 parts by weight and preferably 0.3 to 5 parts by weight. When the addition ratio of the poly(metha)acrylate is less than 0.2 parts by weight, the grease composition has an insufficient low-temperature property. When the mixing ratio of the poly(metha)acrylate is more than 6 parts by weight, further improvement of the low-temperature property of the grease composition cannot be expected, and the cost increases.

The ZnDTP which can be used for the grease composition of the present invention is called zinc dithiophosphate and shown by the following formula (1). As a commercially available product of the ZnDTP, KIKU-LUBE Z112 produced by ADEKA CORPORATION is exemplified.

[Chemical formula 1]

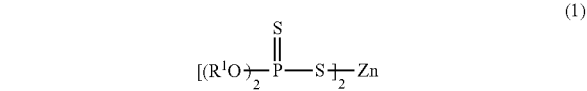

(in the formula, R$^1$ denotes an alkyl group whose carbon number is 1 to 24 or an aryl group whose carbon number is 6 to 30. R$^1$ is preferably a primary alkyl group whose carbon number is 3 to 21.)

By adding the ZnDTP to the highly refined oil, it is possible to decrease the acid value (mg/KOH) of the base oil and significantly improve the life of the grease at high temperatures. Table 1 shows an acid value decrease effect to be obtained by the combination of the ZnDTP and the highly refined oil. The weight decrease rate shown in table 1 is obtained by collecting 10 g of the oil shown in table 1 in a 30 mL beaker and leaving the oil at 150° C. for 1000 hours. As shown in table 1, when the ZnDTP (KIKU-LUBE 2112) is added to the highly refined oil, the acid value decreases, and the weight decrease rate becomes significantly low. On the other hand, when the ZnDTP is added to mineral oil at the same rate as that used for the highly refined oil, the weight decrease rate little changes.

TABLE 1

|  | Additive (ZnDTP) | Weight decrease rate |
|---|---|---|
| Highly refined oil[1)] | Not added | 17 wt % |
|  | 1 wt % | 11 wt % |
| Mineral oil 2[2)] | Not added | 18 wt % |
|  | 1 wt % | 19 wt % |

[1)]Produced by Showa Shell Sekiyu K.K.: Shell Hi-Vac Oil X68
[2)]Produced by Showa Shell Sekiyu K.K.: Shell Vitrea Oil 68

It is preferable to set the addition ratio of the ZnDTP to 0.5 to 5 parts by weight to 100 parts by weight of the base grease. When the addition ratio of the ZnDTP is less than 0.5 parts by weight, it is difficult to obtain a desired effect to a sufficient extent. When the addition ratio of the ZnDTP exceeds 5 parts by weight, there is no increase in the effect to be obtained by the addition of the ZnDTP. Therefore to use more than 5 parts by weight of the ZnDTP is disadvantageous in terms of cost.

In the present invention, the phosphate easily forms an adsorbed film on a metal surface. The adsorbed film is capable of forming a smooth friction surface. The phosphate, particularly TCP reacts with the metal surface to form a metal phosphide. The metal phosphide and a metal form an eutectic mixture (the melting point of the eutectic mixture of iron and iron phosphide is lower than the melting point of iron by 515° C.) having a low melting point. Therefore with friction, the apexes of projections of the metal surface melt and fill valleys, thus forming a very smooth friction surface. The friction surface decreases a contact pressure and improves a lubrication state, thus decreasing wear.

It is preferable to set the addition ratio of the phosphate to 0.1 to 5 parts by weight to 100 parts by weight of the base grease. When the addition ratio of the phosphate is less than 0.1 parts by weight, it is difficult to obtain the desired effect to a sufficient extent. When the addition ratio of the phosphate exceeds 5 parts by weight, there is no increase in the effect to be obtained by the addition of the phosphate. Therefore to use more than 5 parts by weight of the phosphate is disadvantageous in terms of cost.

In using the grease composition of the present invention for a universal joint, it is preferable to add the MoDTC to the base grease as an additive. As the MoDTC which can be used for the grease composition of the present invention, molybdenum dialkyldithio carbamate shown by the following formula (2) is exemplified. As products of the MoDTC, SAKURA-LUBE 600, 200 produced by ADEKA CORPORATION are listed.

[Chemical formula 2]

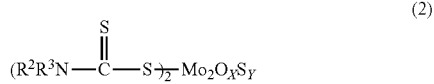

$$(R^2R^3N-\underset{\underset{S}{\|}}{C}-S)_{\overline{2}}-Mo_2O_XS_Y \quad (2)$$

(in the formula, $R^2$ and $R^3$ denote alkyl groups whose carbon number is 1 to 24, favorably 3 to 18, and more favorably 3 to 5 and integers satisfying X+Y=4, where X is 0 to 3 and Y is 4 to 1)

It is preferable that the MoDTC is non-oil-soluble. To check whether the MoDTC is non-oil-soluble, after 0.5 wt % of the MoDTC of the total weight of the dissolved components of the grease composition is added to the base oil for use in grease, the mixture is stirred. An insoluble content precipitates from the non-oil-soluble MoDTC when the stirred solution is observed visually after the solution is left for 70° C.×24 hours. When the insoluble precipitates, the base oil is not transparent, and the MoDTC has a colloidal state or a suspended state, which can be judged visually. The SAKURA-LUBE 600 produced by ADEKA CORPORATION is the non-oil-soluble.

It is preferable that the addition ratio of the MoDTC which can be used in the present invention to 100 parts by weight of the base grease is 0.5 to 5 parts by weight. When the addition ratio of the MoDTC is less than 0.5 parts by weight, it is difficult to obtain the desired effect to a sufficient extent. When the addition ratio of the MoDTC exceeds 5 parts by weight, there is no increase in the effect to be obtained by the addition of the MoDTC to the base grease. Therefore to use more than 5 parts by weight of the MoDTC is disadvantageous in terms of cost.

The grease composition of the present invention is capable of containing various antioxidants such as a phenol-based antioxidant, an amine-based antioxidant, and the like; a rust inhibitor such as carboxylate, sulfonate, and the like; an anti-wear agent such as polyalkylene glycol, glycerin, and the like; an extreme pressure agent such as chlorinated paraffin, sulfur oil, and the like; an oiliness improver such as higher fatty acid, synthetic ester, and the like; and a solid lubricant such as graphite, molybdenum disulfide, and the like.

FIG. 1 shows an example of the rolling bearing of the present invention. FIG. 1 is a sectional view of a deep groove ball bearing in which the grease composition is enclosed. In the deep groove ball bearing 1, an inner ring 2 having an inner ring rolling surface 2a on its peripheral surface and an outer ring 3 having an outer ring rolling surface 3a on its inner peripheral surface are concentrically disposed, and a plurality of rolling elements 4 is disposed between the inner ring rolling surface 2a and the outer ring rolling surface 3a. A cage 5 holding the rolling elements 4 is provided. A sealing member 6 fixed to the outer ring 3 is provided at openings 8a and 8b disposed at both axial ends of the inner ring 2 and the outer ring 3. A grease composition 7 of the present invention is enclosed in at least the circumferences of the rolling elements 4.

Figure 2:
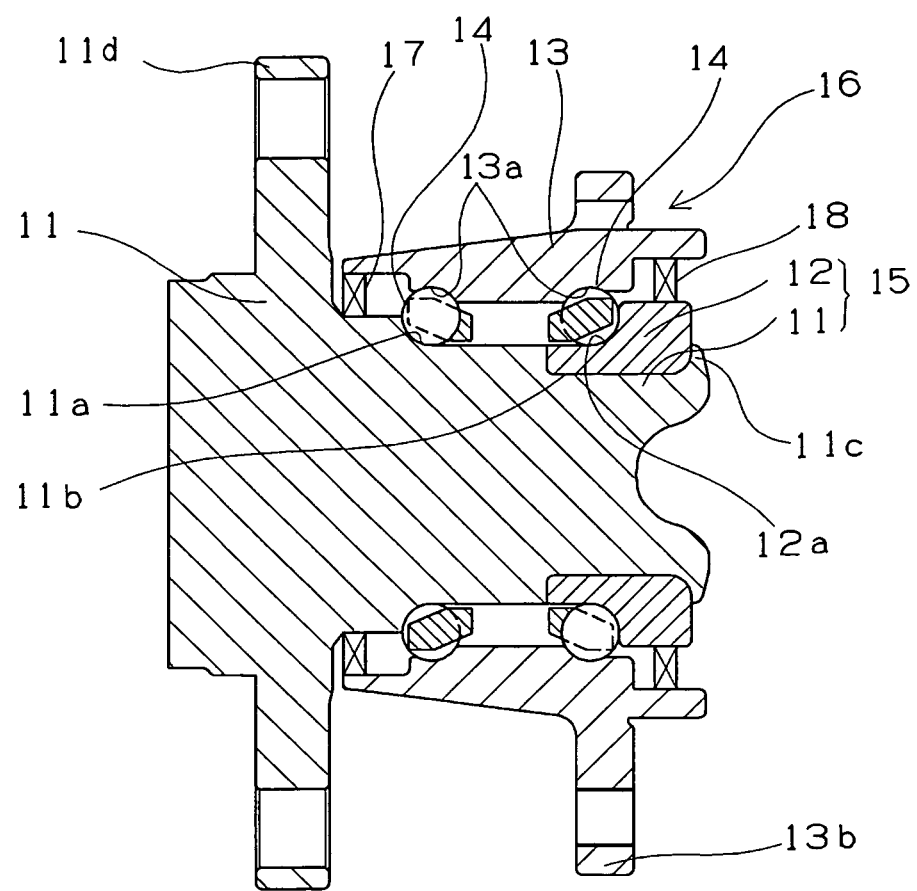
FIG. 2 is a sectional view showing a hub bearing as another example of the rolling bearing of the present invention.

FIG. 2 shows an example (third-generation hub bearing for use in driven wheel) of the rolling bearing of the present invention used as a hub bearing. FIG. 2 is a sectional view showing the hub bearing. A hub bearing 16 has an inner ring (inner member) 15 having a hub ring 11 and a driving inner ring 12, an outer ring (outer member) 13, and double-row rolling elements 14, 14. The hub ring 11 has at its one end a wheel-mounting flange 11d, integral therewith, for mounting a wheel (not shown) thereon. Formed on a periphery of the hub ring 11 are an inside rolling surface 11a and a small-diameter stepped portion 11b extended axially from the inside rolling surface 11a. In the present specification, "outside" in the axial direction means an outer side in the widthwise direction in a state where the hub bearing is mounted on a car, whereas "inside" means a central side in the widthwise direction. The driving inner ring 12 having an inside rolling surface 12a formed on the periphery thereof is fitted in the small-diameter stepped portion 11b of the hub ring 11 by press fit. The removal of the driving inner ring 12 from the hub ring 11 in the axial direction thereof is prevented by a caulking portion 11c formed by plastically deforming an end of the small-diameter stepped portion 11b of the hub ring 21 radially outward. The outer ring 13 has on its periphery a flange 13b which is mounted on the car and integral therewith and has on its inner periphery the double-row rolling elements 14, 14 rollingly accommodated between the outside rolling surfaces 13a, 13a and the inside rolling surfaces 11a, 12a opposed to the double-row outside rolling surfaces 13a, 13a. The grease composition of the present invention is enclosed in a space surrounded with a sealing member 17, the outer ring 13, a sealing member 18, the inner ring 15, and the hub ring 11 so that the grease composition covers the circumference of the double-row rolling elements 14, 14 sandwiched between the outer ring 13 and the inner ring 15 and is used to lubricate a rolling contact portion between the rolling surfaces of the rolling elements 14, 14 and the inside rolling surfaces 11a, 12a as well as the outside rolling surfaces 13a, 13a.

As materials that can be used for the hub bearing, it is possible to list bearing steel, carburized steel, and carbon steel for machine structural use. Of these materials, it is preferable to use the carbon steel for machine structural use such as S53C which has a favorable forgeability and is inexpensive. The carbon steel for machine structural use is used after the rolling fatigue strength of a bearing portion is secured by heat-treating it with a high-frequency wave.

Figure 3:
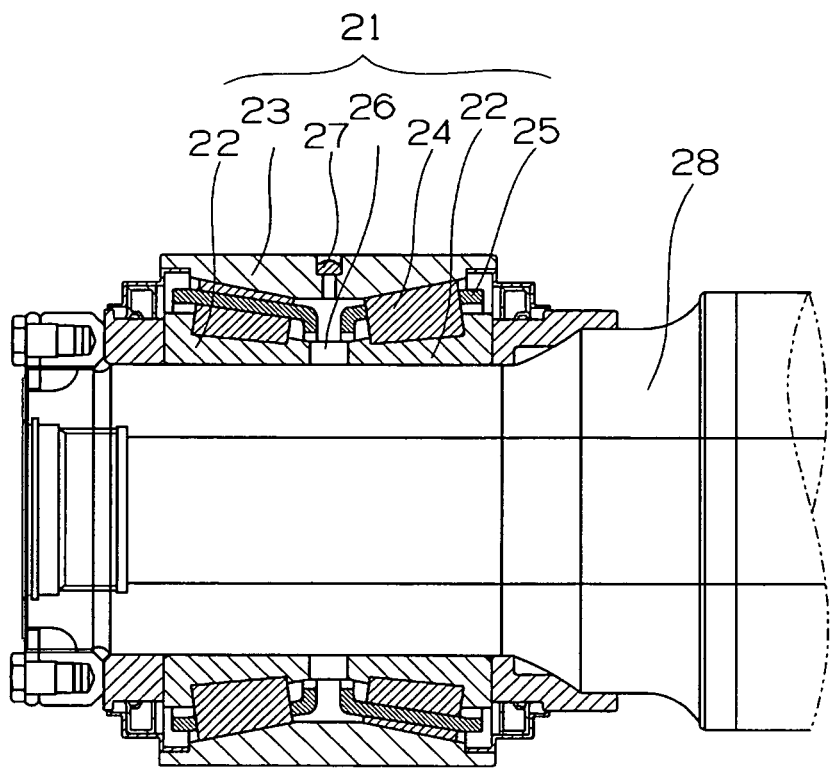
FIG. 3 is a sectional view showing a rolling bearing for supporting an axle as still another example of the rolling bearing of the present invention.

As another example of the rolling bearing of the present invention, a case in which the rolling bearing of the present invention is used for an axle-supporting rolling bearing for supporting the axle of a rolling stock is shown in FIG. 3. FIG. 3 is a sectional view showing the axle-supporting rolling bearing for supporting the axle of the rolling stock. Both end portions of an axle 28 are supported by a tapered roller bearing 21, which is the axle-supporting rolling bearing, mounted on a vehicle underframe (not shown). The tapered roller bearing 21 has an inner ring 22, an outer ring 23, a plurality of tapered rollers 24 which are interposed between the inner ring 22 and the outer ring 23 and rotatably roll, a cage for retaining the tapered rollers 24, a inner ring spacer 26 interposed between the adjacent inner rings 22, and an injection hole 27 for supplying the grease composition of the present invention into the tapered rollers 24.

Figure 4:
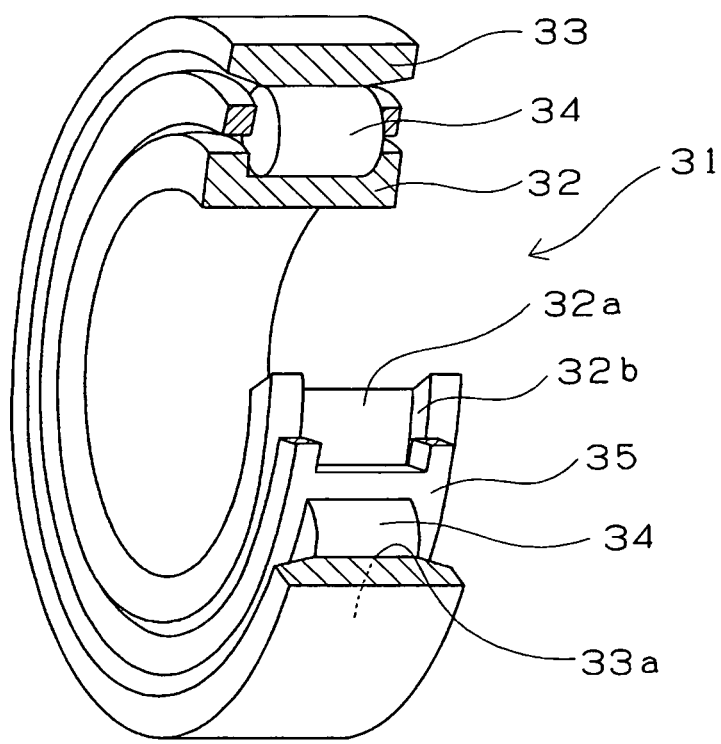
FIG. 4 is a partly cut-away perspective view showing a roller bearing as still another example of the rolling bearing of the present invention.

As another example of the axle-supporting rolling bearing, a case in which a roller bearing is used as the axle-supporting rolling bearing is shown in FIG. 4. FIG. 4 is a partly cut-away perspective view showing the roller bearing. In a roller bearing 31, a roller 34 is disposed between an inner ring 32 and an outer ring 33 via a cage 35. The roller 34 is subjected to rolling friction between a rolling surface 32a of the inner ring 32 and a rolling surface 33a of the outer ring 33, and subjected to sliding friction between flange portions 32b of the inner ring 32. To reduce the rolling friction and the sliding friction, the grease composition of the present invention is enclosed in the axle-supporting rolling bearing.

Figure 5:
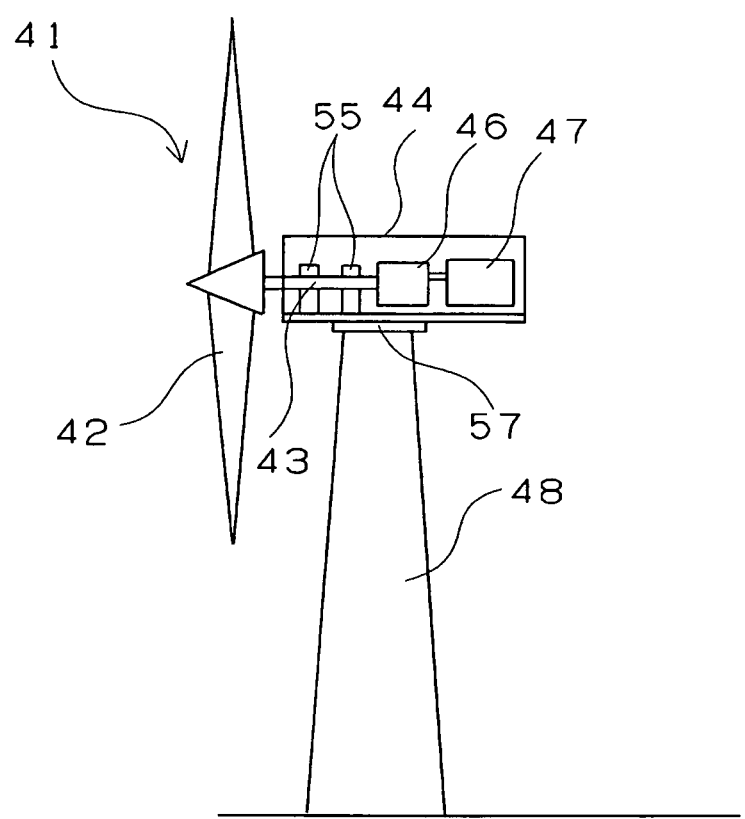
FIG. 5 is a schematic view of an entire wind power generator.
Figure 6:
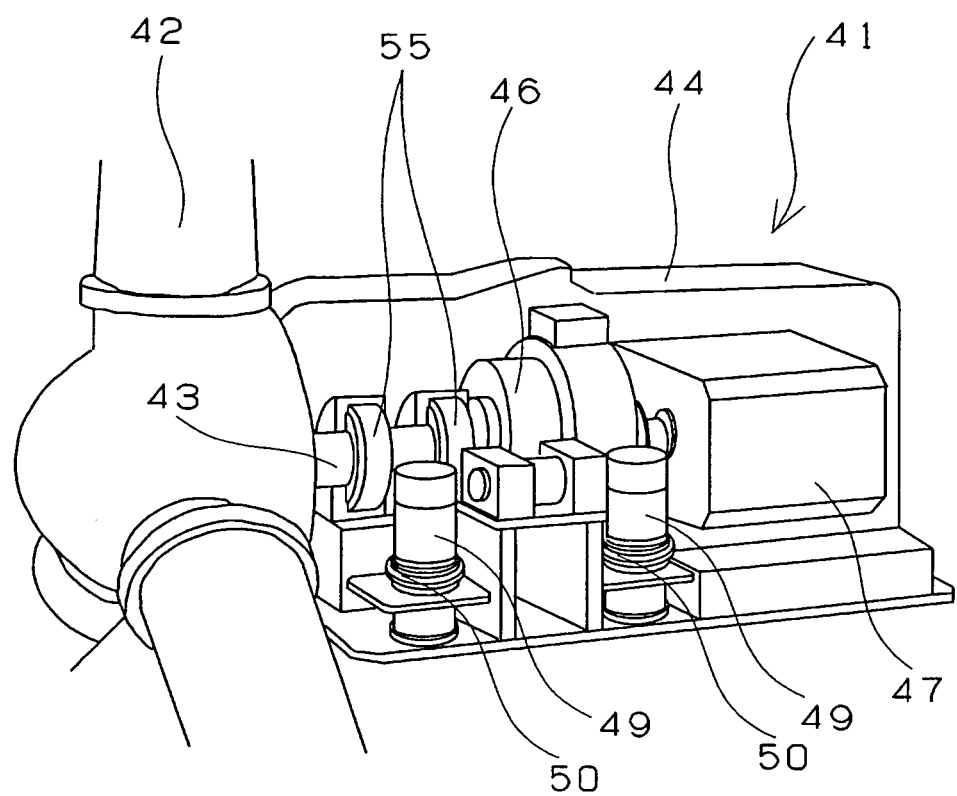
FIG. 6 is a perspective view showing the construction of the wind power generator.

As still another example of the rolling bearing of the present invention, a case in which the rolling bearing of the present invention is used as a rolling bearing for supporting a main shaft of a wind power generator is described below with reference to FIGS. 5 and 6. FIG. 5 is an illustration of an entire wind power generator including the main shaft-supporting rolling bearing. FIG. 6 is a perspective view showing the construction of the wind power generator. As shown in FIG. 5 or FIG. 6, in a wind power generator 41, a main shaft 43 on which a blade 42 serving as a windmill is mounted is rotatably supported by a main shaft-supporting rolling bearing 45 (FIG. 7) mounted in a bearing housing 55 disposed inside a nacelle 44 in which a speed-up gear 46 and an electrical generator 47 are mounted. The speed-up gear 46 increases the rotation of the main shaft 43 and transmits an increased rotational speed to an input shaft of the electrical generator 47. The nacelle 44 is pivotally mounted on a supporting base 48 through a pivotal seat bearing 57 and pivoted by a motor 49 of FIG. 6 for pivotal use through a reducer 50. The nacelle 44 is pivoted so that the direction of the blade 42 confronts the direction of a wind. Although two bearing housings 55 are provided in the example shown in FIG. 6, the number of the bearing housings 55 may be one.

Figure 7:
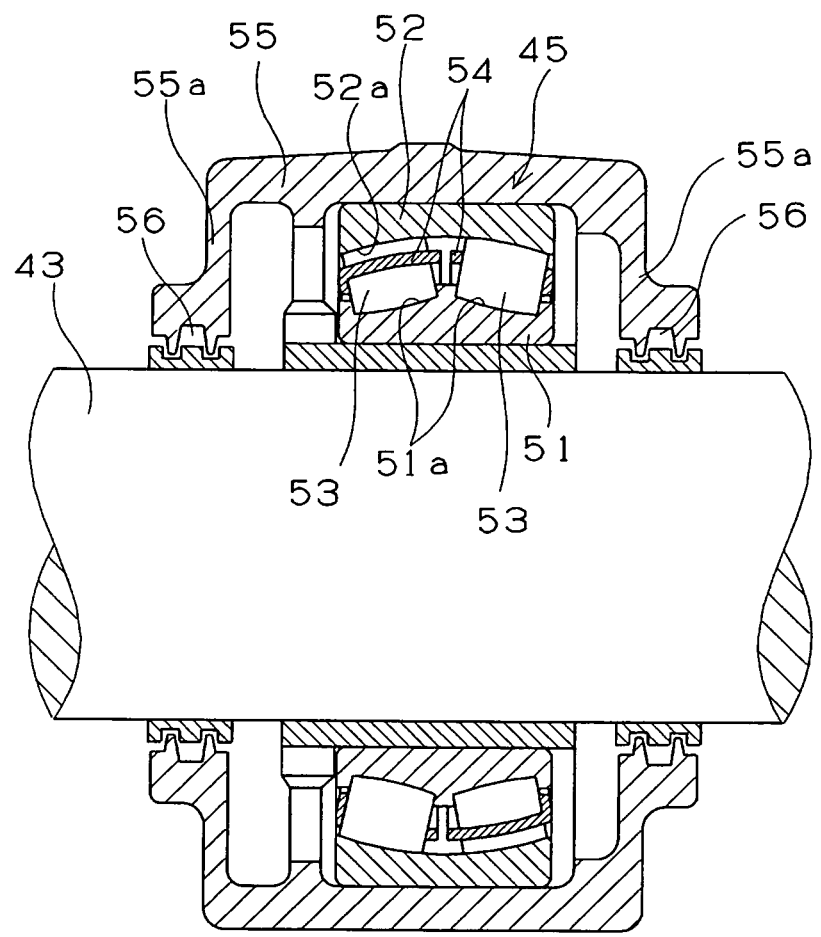
FIG. 7 is a sectional view showing a mounted construction of a main shaft-supporting rolling bearing of the wind power generator.

The mounted construction of the main shaft-supporting rolling bearing 45 is described below with reference to FIG. 7. FIG. 7 shows the mounted construction of the main shaft-supporting rolling bearing 45 of the wind power generator. The main shaft-supporting rolling bearing 45 is a double-row self-aligning roller bearing having an inner ring 51 and an outer ring 52 making a pair of bearing rings and a plurality of rolling elements 53 interposed between the inner ring 51 and the outer ring 52. A raceway surface 52a of the outer ring 52 of the bearing 45 is spherical, and the peripheral surface of each rolling element 53 is formed as a roller spherical along the raceway surface 52a of the outer ring 52. The inner ring 51 has a flange-provided construction having raceway surfaces 51a, 51a of respective rows separately. The rolling element 53 of each row is held by a cage 54. The grease composition of the present invention is enclosed inside the bearing 45. The outer ring 52 is mounted by fitting it on the inside-diameter surface of the bearing housing 55. The inner ring 51 is fitted on the periphery of the main shaft 43 and supports the main shaft 43. In the bearing housing 55, a seal 56 such as a labyrinth seal is constructed between a side wall portion 55a covering both ends of the bearing 45 and the main shaft 43. Because the bearing housing 55 has a sealing property, a construction not having a seal is used for the bearing 45.

As the main shaft-supporting bearing 45, it is possible to use a radial bearing to which an axial load is applicable. In addition to the self-aligning roller bearing shown in FIG. 7, it is possible to use an angular ball bearing, a tapered roller bearing or a deep groove ball bearing as the main shaft-supporting bearing 45. Of these bearings, the self-aligning roller bearing is preferable as the main shaft-supporting bearing of the wind power generator which is driven in a wide load-applied range from a lightweight load to a heavy load applied at the time of a sudden gust of wind and in a state in which the direction of a wind always changes, because the self-aligning roller bearing is capable of absorbing the bending of the main shaft caused by the operation of the wind power generator. The main shaft-supporting rolling bearing 45 can be also utilized as the pivotal seat bearing 57.

The main shaft-supporting rolling bearing of the rolling stock and the wind power generator are large, and a large amount of grease is enclosed therein. By using the grease composition of the present invention, the property at low temperatures and the grease life at high temperatures are maintained at a low cost.

Figure 8:
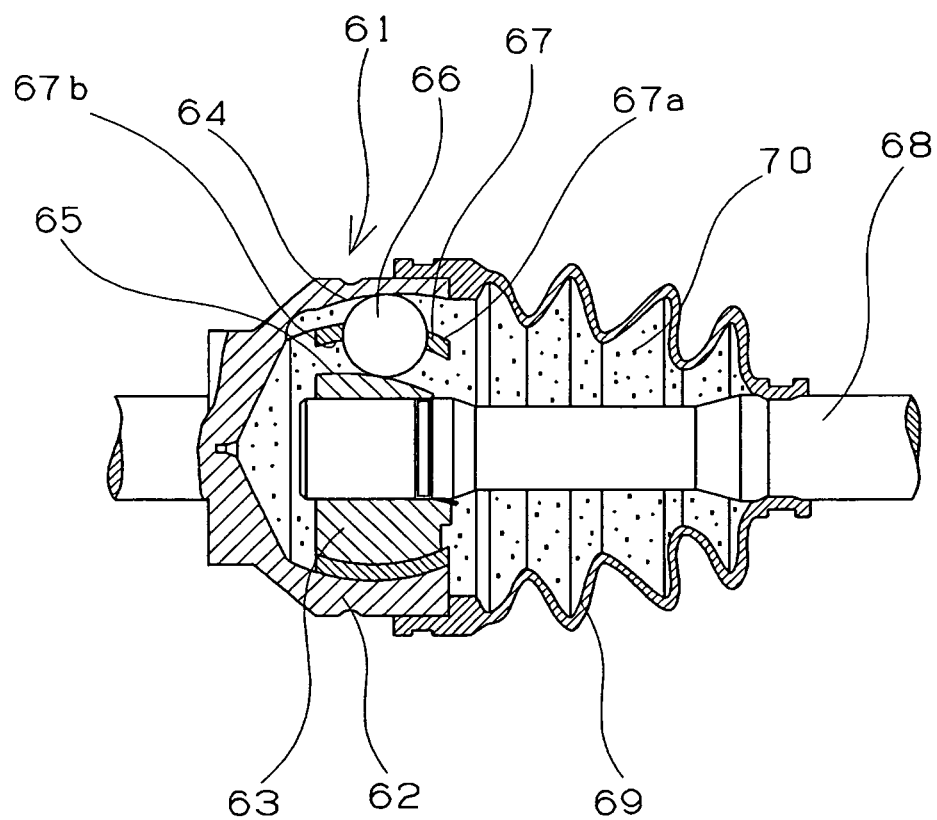
FIG. 8 is a partly cut-away sectional view showing a Rzeppa-type constant-velocity joint which is an example of a universal joint of the present invention.

The universal joint of the present invention is described below with reference to FIG. 8 by taking a constant-velocity joint as an example. FIG. 8 is a partly cut-away sectional view of a Rzeppa-type constant-velocity joint. As shown in FIG. 8, in a constant-velocity joint 61, six track grooves 64, 65 are equiangularly formed on an inner surface of an outer member (outer ring) 62 and an outer surface of a spherical inner member (inner ring), a torque transmission member (ball) 66 incorporated between the track grooves 64 and 65 is supported by a cage 67, and the periphery of the cage 67 is set as a spherical surface 67a, and the inner periphery thereof is set as a spherical surface 67b fitting on the periphery of the inner member 63. The periphery of the outer member 62 and that of a shaft 68 are covered with a boot 69. A grease 70 of the present invention is enclosed in a space surrounded with the outer member 62, the inner member 63, the track grooves 64, 65, the torque transmission member 66, the cage 67, and the shaft 68.

Like the Rzeppa-type constant-velocity joint shown in FIG. 8, as constant-velocity joints having the torque transmission member consisting of a sphere, a constant-velocity joint of a stationary type such as a bar field type and a constant-velocity joint of a slide type such as a double off-set type and a cross groove type are listed. As the slide-type constant-velocity joints having the torque transmission member consisting of a spherical roller, a constant-velocity joint of a tri-port type is exemplified. The grease composition of the present invention can be used for any of the above-described constant-velocity joints.

EXAMPLES

Examples 1 Through 10 and Comparative Examples 1 Through 11

As shown in table 2, the base grease was prepared by selecting a thickener and base oil. The weight of the base grease which is the total of the weight of the thickener and that of the base oil was set to 100 parts by weight. Additives were added to the base grease of each of the examples and the comparative examples, as shown in table 2 to obtain the test grease thereof. The obtained test greases were subjected to a low-temperature torque test shown below and a high-temperature grease life test also shown below to measure torque at a low temperature and the lifetime thereof at a high temperature. Table 2 shows the results.

<Low-Temperature Torque Test>

The low-temperature torque test was carried out in accordance with the low-temperature torque test method specified in JIS K 2220.18. Test greases which had less than 20 mN/m at −20° C. were evaluated as excellent in the low-temperature torque performance and marked by ⊚. Test greases which had not less than 20 and less than 70 mN/m were evaluated as good in the low-temperature torque performance and marked by ○. Test greases which had not less than 70 mN/m were evaluated as inferior in the low-temperature torque performance and marked by X.

<High-Temperature Grease Life Test>

1.8 g of each of the obtained test greases was enclosed in a rolling bearing (6204). The rolling bearing was rotated by applying an axial load of 670N and a radial load of 67N at a temperature of 150° C. and a rotational speed of 10000 rpm to measure a period of time until burning occurred.

TABLE 2

| | Example | | | | | | | | | |
|---|---|---|---|---|---|---|---|---|---|---|
| | 1 | 2 | 3 | 4 | 5 | 6 | 7 | 8 | 9 | 10 |
| Components of base grease (part by weight) | | | | | | | | | | |
| Base oil | | | | | | | | | | |
| Mineral oil 1[1)] | — | — | — | — | — | — | — | — | — | — |
| Mineral oil 2[2)] | — | — | — | — | — | — | — | — | 20 | 44 |
| Mineral Oil 3[3)] | — | — | — | — | — | — | — | — | — | — |
| Highly refined oil 1[4)] | — | — | — | — | — | 85 | — | — | — | — |
| Highly refined oil 2[5)] | 85 | 85 | 85 | 85 | 85 | — | 80 | 83 | 68 | 45 |
| Thickener | | | | | | | | | | |
| Octylamine | 4.1 | 4.1 | 4.1 | 4.1 | 4.1 | 4.1 | — | — | 3.2 | 3 |
| Cyclohexylamine | 3.1 | 3.1 | 3.1 | 3.1 | 3.1 | 3.1 | — | 3.7 | 2.5 | 2.3 |
| p-toluidine | — | — | — | — | — | — | 9.2 | 4 | — | — |
| MDI[6)] | 7.8 | 7.8 | 7.8 | 7.8 | 7.8 | 7.8 | 10.8 | 9.3 | 6.3 | 5.7 |
| (Total of components of base grease) | 100 | 100 | 100 | 100 | 100 | 100 | 100 | 100 | 100 | 100 |
| Additive | | | | | | | | | | |
| Zinc dithiophosphate[7)] | 2 | 2 | 2 | 2 | 2 | 2 | 2 | 2 | 2 | 2 |
| Polymethacrylate 1[8)] | — | — | — | — | — | — | — | — | — | — |
| Polymethacrylate 2[9)] | 1 | — | 0.3 | 3 | 5 | 1 | 1 | 1 | 1 | 1 |
| Polymethacrylate 3[10)] | — | 1 | — | — | — | — | — | — | — | — |
| Kinematic viscosity of base oil (40° C., mm²/s) | 67 | 67 | 67 | 67 | 67 | 47 | 67 | 67 | 67 | 68 |
| Mixing worked penetration (JIS K2220) | No. 2 | No. 2 | No. 2 | No. 2 | No. 2 | No. 2 | No. 2 | No. 2 | No. 2 | No. 2 |
| Low torque temperature, mN·m | 16 | 15 | 17 | 18 | 25 | 14 | 14 | 21 | 17 | 18 |
| Evaluation of torque performance at low temperatures | ◎ | ◎ | ◎ | ◎ | ○ | ◎ | ◎ | ○ | ◎ | ◎ |
| High-temperature high-speed test, h | >3000 | >3000 | >3000 | >3000 | >3000 | >3000 | 2580 | >3000 | >3000 | 2760 |

| | Comparative example | | | | | | | | | | |
|---|---|---|---|---|---|---|---|---|---|---|---|
| | 1 | 2 | 3 | 4 | 5 | 6 | 7 | 8 | 9 | 10 | 11 |
| Components of base grease (part by weight) | | | | | | | | | | | |
| Base oil | | | | | | | | | | | |
| Mineral oil 1[1)] | — | — | — | — | — | — | — | 90 | — | — | — |
| Mineral oil 2[2)] | — | — | — | — | — | — | — | — | 90 | — | 70 |
| Mineral Oil 3[3)] | — | — | — | — | — | — | — | — | — | 90 | — |
| Highly refined oil 1[4)] | — | — | — | — | — | 85 | 85 | — | — | — | — |
| Highly refined oil 2[5)] | 85 | 85 | 85 | 85 | 85 | — | — | — | — | — | 20 |
| Thickener | | | | | | | | | | | |
| Octylamine | 4.1 | 4.1 | 4.1 | 4.1 | 4.1 | 4.1 | 4.1 | 2.7 | 2.7 | 2.7 | 2.7 |
| Cyclohexylamine | 3.1 | 3.1 | 3.1 | 3.1 | 3.1 | 3.1 | 3.1 | 2.1 | 2.1 | 2.1 | 2.1 |
| p-toluidine | — | — | — | — | — | — | — | — | — | — | — |
| MDI[6)] | 7.8 | 7.8 | 7.8 | 7.8 | 7.8 | 7.8 | 7.8 | 5.2 | 5.2 | 5.2 | 5.2 |
| (Total of components of base grease) | 100 | 100 | 100 | 100 | 100 | 100 | 100 | 100 | 100 | 100 | 100 |
| Additive | | | | | | | | | | | |
| Zinc dithiophosphate[7)] | 2 | 2 | 2 | — | 2 | 2 | — | 2 | 2 | 2 | 2 |
| Polymethacrylate 1[8)] | 1 | — | — | — | — | — | — | — | — | — | — |
| Polymethacrylate 2[9)] | — | 0.1 | 7 | 1 | — | — | 1 | 1 | 1 | 1 | 1 |
| Polymethacrylate 3[10)] | — | — | — | — | — | — | — | — | — | — | — |
| Kinematic viscosity of base oil (40° C., mm²/s) | 67 | 67 | 67 | 67 | 67 | 47 | 47 | 32 | 68 | 100 | 68 |
| Mixing worked penetration (JIS K2220) | No. 2 | No. 2 | No. 2 | No. 2 | No. 2 | No. 2 | No. 2 | No. 2 | No. 2 | No. 2 | No. 2 |
| Low torque temperature, mN·m | 135 | 84 | 114 | 19 | 141 | 137 | 18 | 18 | 76 | 84 | 71 |
| Evaluation of torque performance at low temperatures | X | X | X | ◎ | X | X | ◎ | ◎ | X | X | X |
| High-temperature high-speed test, h | >3000 | >3000 | >3000 | 840 | >3000 | >3000 | 710 | 860 | 920 | 1030 | 1280 |

[1)] Produced by Showa Shell Sekiyu K.K.: Shell Vitrea Oil 32 (viscosity index: 98, S: not more than 0.53 wt %, P: not more than 0.01 wt %)
[2)] Produced by Showa Shell Sekiyu K.K.: Shell Vitrea Oil 68 (viscosity index: 96, S: not more than 0.58 wt %, P: not more than 0.01 wt %)
[3)] Produced by Showa Shell Sekiyu K.K.: Shell Vitrea Oil 100 (viscosity index: 95, S: not more than 0.61 wt %, P: not more than 0.01 wt %)
[4)] Produced by Showa Shell Sekiyu K.K.: Shell Hi-Vac Oil X46 (viscosity index: 127, S: not more than 0.01 wt %, P: not more than 0.01 wt %)
[5)] Produced by Showa Shell Sekiyu K.K.: Shell Hi-Vac Oil X68 (viscosity index: 127, S: not more than 0.01 wt %, P: not more than 0.01 wt %)
[6)] Produced by Nippon Polyurethane Industry Co., Ltd.: Millionate MT
[7)] Produced by ADEKA CORPORATION: KIKU-LUBE Z112
[8)] Produced by Sanyo Chemical Industries Ltd.: ACLUBE 504 (kinematic viscosity at 100° C.: 850 mm²/s)
[9)] Produced by Sanyo Chemical Industries Ltd.: ACLUBE 132 (kinematic viscosity at 100° C.: 380 mm²/s)
[10)] Produced by Sanyo Chemical Industries Ltd.: ACLUBE 136 (kinematic viscosity at 100° C.: 100 mm²/s)

The test greases of the comparative examples 1, 5, and 6 in which the predetermined polymethacrylate was not added to the base greases thereof were inferior in the fretting-resistant performance at low temperatures. The test greases of the comparative examples 2 and 3 in which the predetermined polymethacrylate was added to the base greases out of a predetermined range were also inferior in the fretting-resistant performance at low temperatures. In the test greases of the comparative examples 4 and 7 in which the predetermined highly refined oil and the polymethacrylate were used, but the ZnDTP was not added to the base greases, each of the test greases had a short life at high temperatures. In the test greases of the comparative examples 8 through 11 in which the ZnDTP was added to the base grease, but the base grease did not contain not less than 50 wt % of the predetermined highly refined oil, each of the test greases had a short life at high temperatures. This is considered due to the effect shown in table 1. In comparative with the test greases of the comparative examples, the test greases of the examples were excellent in the torque performance at low temperatures and had long lives at high temperatures.

Examples 11 Through 19 and Comparative Examples 12 Through 20

As shown in table 3, the base grease was prepared by selecting a thickener and base oil. The weight of the base grease which is the total of the weight of the thickener and that of the base oil was set to 100 parts by weight. Additives were added to the base grease of each of the examples and the comparative examples, as shown in table 3 to obtain the test grease thereof. The obtained test greases were subjected to a low-temperature fretting test shown below to measure the wear amount of a bearing. Table 3 shows the results.

<Low-Temperature Fretting Test>

In conformity to ASTM G-111-12, a performance evaluation test was conducted by using a Fafnir friction oxidation testing machine. Using 51204 as a bearing, the test was conducted in conditions in which a maximum contact surface pressure was 2.0 GPa, an oscillation motion cycle was 30 Hz, an oscillation angle was 12°, and an atmosphere was −20° C. The test period of time was set to eight hours. The performance was evaluated in terms of a wear amount (mg) per bearing.

TABLE 3

|  | Example | | | | | | | | |
|---|---|---|---|---|---|---|---|---|---|
|  | 11 | 12 | 13 | 14 | 15 | 16 | 17 | 18 | 19 |
| Components of base grease (part by weight) | | | | | | | | | |
| Base oil | | | | | | | | | |
| Mineral oil 1[1)] | — | — | — | — | — | — | — | 44 | — |
| Mineral oil 2[2)] | — | — | — | — | — | 20 | 44 | — | — |
| Highly refined oil 2[3)] | 85 | 85 | 85 | 85 | 85 | 68 | 45 | 45 | 85 |
| Thickener | | | | | | | | | |
| Octylamine | 4.1 | 4.1 | 4.1 | 4.1 | 4.1 | 3.2 | 3 | 3 | 4.1 |
| Cyclohexylamine | 3.1 | 3.1 | 3.1 | 3.1 | 3.1 | 2.5 | 2.3 | 2.3 | 3.1 |
| MDI[4)] | 7.8 | 7.8 | 7.8 | 7.8 | 7.8 | 6.3 | 5.7 | 5.7 | 7.8 |
| (Total of components of base grease) | 100 | 100 | 100 | 100 | 100 | 100 | 100 | 100 | 100 |
| Additive | | | | | | | | | |
| Zinc dithiophosphate[5)] | 2 | 2 | 2 | 2 | 2 | 2 | 2 | 2 | 2 |
| Polymethacrylate 1[6)] | — | — | — | — | — | — | — | — | — |
| Polymethacrylate 2[7)] | 1 | — | 0.3 | 3 | 5 | 1 | 1 | 1 | 1 |
| Polymethacrylate 3[8)] | — | 1 | — | — | — | — | — | — | — |
| TCP[9)] | 1 | 1 | 1 | 1 | 1 | 1 | 1 | 1 | — |
| Kinematic viscosity of base oil (40° C., mm$^2$/s) | 67 | 67 | 67 | 67 | 67 | 75 | 84 | 68 | 67 |
| Mixing worked penetration (JIS K2220) | No. 2 | No. 2 | No. 2 | No. 2 | No. 2 | No. 2 | No. 2 | No. 2 | No. 2 |
| Fretting test, mg | 1.2 | 1.4 | 1.4 | 1.3 | 1.9 | 1.5 | 1.9 | 1.8 | 4.6 |

|  | Comparative example | | | | | | | | |
|---|---|---|---|---|---|---|---|---|---|
|  | 12 | 13 | 14 | 15 | 16 | 17 | 18 | 19 | 20 |
| Components of base grease (part by weight) | | | | | | | | | |
| Base oil | | | | | | | | | |
| Mineral oil 1[1)] | — | — | — | — | — | 90 | — | 70 | — |
| Mineral oil 2[2)] | — | — | — | — | — | — | 90 | — | — |
| Highly refined oil 2[3)] | 85 | 85 | 85 | 85 | 85 | — | — | 20 | 85 |
| Thickener | | | | | | | | | |
| Octylamine | 4.1 | 4.1 | 4.1 | 4.1 | 4.1 | 2.7 | 2.7 | 2.7 | 4.1 |
| Cyclohexylamine | 3.1 | 3.1 | 3.1 | 3.1 | 3.1 | 2.1 | 2.1 | 2.1 | 3.1 |
| MDI[4)] | 7.8 | 7.8 | 7.8 | 7.8 | 7.8 | 5.2 | 5.2 | 5.2 | 7.8 |
| (Total of components of base grease) | 100 | 100 | 100 | 100 | 100 | 100 | 100 | 100 | 100 |
| Additive | | | | | | | | | |
| Zinc dithiophosphate[5)] | 2 | 2 | 2 | — | 2 | 2 | 2 | 2 | — |
| Polymethacrylate 1[6)] | 1 | — | — | — | — | — | — | — | — |
| Polymethacrylate 2[7)] | — | 0.1 | 7 | 1 | — | 1 | 1 | 1 | — |
| Polymethacrylate 3[8)] | — | — | — | — | — | — | — | — | — |
| TCP[9)] | 1 | 1 | 1 | 1 | 1 | 1 | 1 | 1 | — |

TABLE 3-continued

| Kinematic viscosity of base oil (40° C., mm²/s) | 67 | 67 | 67 | 67 | 67 | 68 | 100 | 68 | 67 |
|---|---|---|---|---|---|---|---|---|---|
| Mixing worked penetration (JIS K2220) | No. 2 | No. 2 | No. 2 | No. 2 | No. 2 | No. 2 | No. 2 | No. 2 | No. 2 |
| Fretting test, mg | 3.4 | 2.8 | 3.1 | 4.1 | 3.5 | 2.6 | 2.7 | 2.4 | 18 |

[1] Produced by Showa Shell Sekiyu K.K.: Shell Vitrea Oil 68 (viscosity index: 96, S: not more than 0.58 wt %, P: not more than 0.01 wt %)
[2] Produced by Showa Shell Sekiyu K.K.: Shell Vitrea Oil 100 (viscosity index: 95, S: not more than 0.61 wt %, P: not more than 0.01 wt %)
[3] Produced by Showa Shell Sekiyu K.K.: Shell Hi-Vac Oil X68 (viscosity index: 127, S: not more than 0.01 wt %, P: not more than 0.01 wt %)
[4] Produced by Nippon Polyurethane Industry Co., Ltd.: Millionate MT
[5] Produced by ADEKA CORPORATION: KIKU-LUBE Z112
[6] Produced by Sanyo Chemical Industries Ltd.: ACLUBE 504 (kinematic viscosity at 100° C.: 850 mm²/s)
[7] Produced by Sanyo Chemical Industries Ltd.: ACLUBE 132 (kinematic viscosity at 100° C.: 380 mm²/s)
[8] Produced by Sanyo Chemical Industries Ltd.: ACLUBE 136 (kinematic viscosity at 100° C.: 100 mm²/s)
[9] Tricresyl phosphate In the test greases of the comparative examples 12, 16, and 20 in which the predetermined polymethacrylate was not added to the base grease thereof, they were inferior in the fretting-resistant performance at low temperatures. In the test greases of the comparative examples 13 and 14 in which the predetermined polymethacrylate was added to the base grease out of the predetermined range, they were also inferior in the fretting-resistant performance at low temperatures. In the test greases of the comparative example 15 in which the TCP, the predetermined highly refined oil and polymethacrylate were used, but the ZnDTP was not added to the base grease, the test grease had an inferior fretting resistance performance at low temperatures. In the test greases of the comparative examples 17 through 19 in which the ZnDTP, the TCP, and the predetermined polymethacrylate were added to the base grease, but the base grease did not contain not less than 50 wt % of the predetermined highly refined oil, they had an inferior fretting resistance performance at low temperatures. In comparison with the test greases of the comparative examples, the test greases of the examples (examples 11 through 18) in which the predetermined highly refined oil was used, and the polymethacrylate, the ZnDTP, and the TCP were added to the base grease were excellent in the fretting resistance performance at low temperatures.

Examples 20 Through 31 and Comparison Examples 21 Through 29,

As shown in table 4, the base grease was prepared by selecting a thickener and base oil. The weight of the base grease which is the total of the weight of the thickener and that of the base oil was set to 100 parts by weight. Additives were added to the base grease of each of the examples and the comparative examples, as shown in table 4 to obtain the test grease thereof. The obtained test greases were subjected to a SRV friction and wear test shown below to measure friction coefficients. Table 4 shows the results.

<SRV Friction and Wear Test>

| Test piece: | ball | diameter 10 mm (SUJ2) |
|---|---|---|
|  | disk plate | diameter 24 mm × 7.85 mm (SUJ2) |
| Evaluation condition: | Surface pressure in point contact | 2.6 GPa |
|  | Frequency | 10 Hz |
|  | Amplitude | 1.2 mm |
|  | Time | 30 minutes |
|  | Test temperature | −20° C., 100° C. |
| Measured item: | average value of (values which became constant within a measured period of time) | |

TABLE 4

| | Example | | | | | | | | | | | |
|---|---|---|---|---|---|---|---|---|---|---|---|---|
| | 20 | 21 | 22 | 23 | 24 | 25 | 26 | 27 | 28 | 29 | 30 | 31 |
| Components of base grease (part by weight) | | | | | | | | | | | | |
| Base oil | | | | | | | | | | | | |
| Mineral oil 1[1] | — | — | — | — | — | — | — | — | 45 | — | — | — |
| Mineral oil 2[2] | — | — | — | — | — | — | 21 | 45 | — | — | — | — |
| Highly refined oil 2[3] | 90 | 85 | 90 | 90 | 90 | 90 | 70 | 46 | 46 | 90 | 90 | 90 |
| Thickener | | | | | | | | | | | | |
| Octylamine | 2.7 | 4.1 | 2.7 | 2.7 | 2.7 | 2.7 | 2.4 | 2.4 | 2.4 | 2.7 | 2.7 | 2.7 |
| Cyclohexylamine | 2.1 | 3.1 | 2.1 | 2.1 | 2.1 | 2.1 | 1.9 | 1.9 | 1.9 | 2.1 | 2.1 | 2.1 |
| MDI[4] | 5.2 | 7.8 | 5.2 | 5.2 | 5.2 | 5.2 | 4.7 | 4.7 | 4.7 | 5.2 | 5.2 | 5.2 |
| (Total of components of base grease) | 100 | 100 | 100 | 100 | 100 | 100 | 100 | 100 | 100 | 100 | 100 | 100 |
| Additive | | | | | | | | | | | | |
| Zinc dithiophosphate[5] | 2 | 2 | 2 | 2 | 2 | 2 | 2 | 2 | 2 | 2 | 2 | 2 |
| Polymethacrylate 1[6] | — | — | — | — | — | — | — | — | — | — | — | — |
| Polymethacrylate 2[7] | 1 | 1 | — | 0.3 | 3 | 5 | 1 | 1 | 1 | 1 | 1 | 1 |
| Polymethacrylate 3[8] | — | — | 1 | — | — | — | — | — | — | — | — | — |
| MoDTC1[9] | 2 | 2 | 2 | 2 | 2 | 2 | 2 | 2 | 2 | 1 | — | — |

TABLE 4-continued

|  |  |  |  |  |  |  |  |  |  |  |  |  |
|---|---|---|---|---|---|---|---|---|---|---|---|---|
| MoDTC2[10] | — | — | — | — | — | — | — | — | — | — | 2 | — |
| Kinematic viscosity of base oil (40° C., mm²/s) | 67 | 67 | 67 | 67 | 67 | 67 | 75 | 84 | 68 | 67 | 67 | 67 |
| Mixing worked penetration (JIS K2220) | No. 1 | No. 2 | No. 1 | No. 1 | No. 1 | No. 1 | No. 1 | No. 1 | No. 1 | No. 1 | No. 1 | No. 1 |
| Friction coefficient (−20° C.) | 0.12 | 0.18 | 0.13 | 0.14 | 0.13 | 0.16 | 0.16 | 0.18 | 0.17 | 0.17 | 0.19 | 0.25 |
| Friction coefficient (100° C.) | 0.057 | 0.062 | 0.058 | 0.059 | 0.058 | 0.063 | 0.056 | 0.055 | 0.056 | 0.068 | 0.071 | 0.089 |

|  | Comparative example |  |  |  |  |  |  |  |  |
|---|---|---|---|---|---|---|---|---|---|
|  | 21 | 22 | 23 | 24 | 25 | 26 | 27 | 28 | 29 |
| Components of base grease (part by weight) Base oil |  |  |  |  |  |  |  |  |  |
| Mineral oil 1[1] | — | — | — | — | — | 92 | — | 71 | — |
| Mineral oil 2[2] | — | — | — | — | — | — | 92 | — | — |
| Highly refined oil 2[3] | 90 | 90 | 90 | 90 | 90 | — | — | 21 | 90 |
| Thickener |  |  |  |  |  |  |  |  |  |
| Octylamine | 2.7 | 2.7 | 2.7 | 2.7 | 2.7 | 2.2 | 2.2 | 2.2 | 2.7 |
| Cyclohexylamine | 2.1 | 2.1 | 2.1 | 2.1 | 2.1 | 1.6 | 1.6 | 1.6 | 2.1 |
| MDI[4] | 5.2 | 5.2 | 5.2 | 5.2 | 5.2 | 4.2 | 4.2 | 4.2 | 5.2 |
| (Total of components of base grease) | 100 | 100 | 100 | 100 | 100 | 100 | 100 | 100 | 100 |
| Additive |  |  |  |  |  |  |  |  |  |
| Zinc dithiophosphate[5] | 2 | 2 | 2 | — | 2 | 2 | 2 | 2 | — |
| Polymethacrylate 1[6] | 1 | — | — | — | — | — | — | — | — |
| Polymethacrylate 2[7] | — | 0.1 | 7 | 1 | — | 1 | 1 | 1 | — |
| Polymethacrylate 3[8] | — | — | — | — | — | — | — | — | — |
| MoDTC1[9] | 2 | 2 | 2 | 2 | 2 | 2 | 2 | 2 | — |
| MoDTC2[10] | — | — | — | — | — | — | — | — | — |
| Kinematic viscosity of base oil (40° C., mm²/s) | 67 | 67 | 67 | 67 | 67 | 68 | 100 | 68 | 67 |
| Mixing worked penetration (JIS K2220) | No. 1 | No. 1 | No. 1 | No. 1 | No. 1 | No. 1 | No. 1 | No. 1 | No. 1 |
| Friction coefficient (−20° C.) | 0.25 | 0.22 | 0.24 | 0.23 | 0.26 | 0.28 | 0.3 | 0.26 | 0.31 |
| Friction coefficient (100° C.) | 0.059 | 0.06 | 0.061 | 0.066 | 0.059 | 0.056 | 0.055 | 0.056 | 0.13 |

[1]Produced by Showa Shell Sekiyu K.K.: Shell Vitrea Oil 68 (viscosity index: 96, S: not more than 0.58 wt %, P: not more than 0.01 wt %)
[2]Produced by Showa Shell Sekiyu K.K.: Shell Vitrea Oil 100 (viscosity index: 95, S: not more than 0.61 wt %, P: not more than 0.01 wt %)
[3]Produced by Showa Shell Sekiyu K.K.: Shell Hi-Vac Oil X68 (viscosity index: 127, S: not more than 0.01 wt %, P: not more than 0.01 wt %)
[4]Produced by Nippon Polyurethane Industry Co., Ltd.: Millionate MT 5) Produced by ADEKA CORPORATION: KIKU-LUBE Z112
[6]Produced by Sanyo Chemical Industries Ltd.: ACLUBE 504 (kinematic viscosity at 100° C.: 850 mm²/s)
[7]Produced by Sanyo Chemical Industries Ltd.: ACLUBE 132 (kinematic viscosity at 100° C.: 380 mm²/s)
[8]Produced by Sanyo Chemical Industries Ltd.: ACLUBE 136 (kinematic viscosity at 100° C.: 100 mm²/s)
9)Produced by ADEKA CORPORATION: SAKURA-LUBE 600 (non-oil-soluble)
[10]Produced by ADEKA CORPORATION: SAKURA-LUBE 200 (oil-soluble)

In the test grease of the comparison example 29, the ZnDTP, the polymethacrylate, and the MoDTC were not added to the base grease. Thus the test grease was inferior in its wear-resistant performance at low temperatures and in addition was outstandingly inferior at high temperatures. The test greases of the comparative examples 21 and 25 in which the predetermined polymethacrylate was not added to the base grease were inferior in the wear-resistant performance at low temperatures. The test greases of the comparative examples 22 and 23 in which the predetermined polymethacrylate was added to the base grease out of the predetermined range were also inferior in the wear-resistant performance at low temperatures. The test greases of the comparative example 24 in which the ZnDTP was not added to the base grease were also inferior in the wear-resistant performance at low temperatures. The test greases of the comparative examples 26 and 27 in which the highly refined oil was not used were also inferior in the wear-resistant performance at low temperatures. In the test grease of the comparative example 28 in which the ZnDTP, the MoDTC, and the predetermined polymethacrylate were added to the base grease, but the base grease did not contain not less than 50 wt % of the predetermined highly refined oil, the test greases were inferior in the wear-resistant performance at low temperatures. In comparison with the test greases of the comparative examples, the test greases of the examples (20 through 30) in which the predetermined highly refined oil was used, and the polymethacrylate, the ZnDTP, and the MoDTC were added to the base grease were excellent in the wear-resistant performance at low and high temperatures.

Examples 32 Through 44 and Comparative Examples 30 Through 38

As shown in table 5, the base grease was prepared by selecting a thickener and base oil. The weight of the base grease which is the total of the weight of the thickener and that of the base oil was set to 100 parts by weight. Additives were added to the base grease of each of the examples and the comparative examples, as shown in table 5 to obtain the test grease thereof. The obtained test greases were subjected to the low-temperature fretting test shown below to measure the wear amount of a bearing. Table 5 shows the results.

The lithium soap used as the thickener is lithium 12 hydroxystearate. The lithium complex soap was obtained by a reaction among 12 hydroxystearic acid, azelaic acid, and lithium hydroxide in the base oil. The complex amide lithium soap was obtained by a reaction among stearic acid amide, sebacic acid, and lithium hydroxide in the base oil.

<Measurement of Oil Separation Degree>

In conformity to JIS K2220.11, the oil separation degree (wt %) was measured by leaving the test greases at 70° C. for 1000 hours.

<Low-Temperature Fretting Test>

In conformity to ASTM G-111-12, a performance evaluation test was conducted by using the Fafnir friction oxidation testing machine. Using 51204 as a bearing, the test was conducted in conditions in which the maximum contact surface pressure was 2.0 GPa, the oscillation motion cycle was 30 Hz, the oscillation angle was 12°, and the atmosphere was −20° C. The test period of time was set to eight hours. The performance was evaluated in terms of the wear amount (mg) per bearing.

TABLE 5

| | Example | | | | | | | | | | | | |
|---|---|---|---|---|---|---|---|---|---|---|---|---|---|
| | 32 | 33 | 34 | 35 | 36 | 37 | 38 | 39 | 40 | 41 | 42 | 43 | 44 |
| Components of base grease (part by weight) Base oil | | | | | | | | | | | | | |
| Mineral oil 1[1)] | — | — | — | — | — | — | — | — | — | — | 40 | — | — |
| Mineral oil 2[2)] | — | — | — | — | — | — | 21 | — | — | 40 | — | — | — |
| Highly refined oil 2[3)] | 80 | 75 | 80 | 80 | 80 | 80 | 60 | 82 | 88 | 41 | 41 | 90 | 80 |
| Thickener | | | | | | | | | | | | | |
| Lithium soap | — | — | — | — | — | — | — | — | 12 | — | — | — | — |
| Lithium complex soap | — | — | — | — | — | — | — | 18 | — | — | — | — | — |
| Amide lithium complex soap | 20 | 25 | 20 | 20 | 20 | 20 | 19 | — | — | 19 | 19 | — | 20 |
| Octylamine | — | — | — | — | — | — | — | — | — | — | — | 2.7 | — |
| Cyclohexylamine | — | — | — | — | — | — | — | — | — | — | — | 2.1 | — |
| MDI[4)] | — | — | — | — | — | — | — | — | — | — | — | 5.2 | — |
| (Total of components of base grease) | 100 | 100 | 100 | 100 | 100 | 100 | 100 | 100 | 100 | 100 | 100 | 100 | 100 |
| Additive | | | | | | | | | | | | | |
| Zinc dithiophosphate[5)] | 2 | 2 | 2 | 2 | 2 | 2 | 2 | 2 | 2 | 2 | 2 | 2 | 2 |
| Polymethacrylate 1[6)] | — | — | — | — | — | — | — | — | — | — | — | — | — |
| Polymethacrylate 2[7)] | 1 | 1 | — | 0.3 | 3 | 5 | 1 | 1 | 1 | 1 | 1 | 1 | 1 |
| Polymethacrylate 3[8)] | — | — | 1 | — | — | — | — | — | — | — | — | — | — |
| TCP[9)] | 1 | 1 | 1 | 1 | 1 | 1 | 1 | 1 | 1 | 1 | 1 | 1 | — |
| Kinematic viscosity of base oil (40° C., mm$^2$/s) | 67 | 67 | 67 | 67 | 67 | 67 | 75 | 67 | 67 | 84 | 68 | 67 | 67 |
| Mixing worked penetration (JIS K2220) | No. 1 | No. 2 | No. 1 | No. 1 | No. 1 | No. 1 | No. 1 | No. 1 | No. 1 | No. 1 | No. 1 | No. 2 | No. 1 |
| Oil separation degree (wt %) | 8.7 | 7.4 | 8.9 | 7.9 | 8.9 | 9.3 | 7.6 | 8.2 | 7.8 | 6.8 | 6.7 | 1.1 | 8.6 |
| Fretting test, mg | 2.3 | 2.5 | 2.7 | 2.8 | 2.5 | 3.1 | 2.9 | 2.6 | 2.8 | 3.5 | 3.4 | 1.2 | 7.4 |

| | Comparative example | | | | | | | | |
|---|---|---|---|---|---|---|---|---|---|
| | 30 | 31 | 32 | 33 | 34 | 35 | 36 | 37 | 38 |
| Components of base grease (part by weight) Base oil | | | | | | | | | |
| Mineral oil 1[1)] | — | — | — | — | — | 82 | — | 62 | — |
| Mineral oil 2[2)] | — | — | — | — | — | — | 82 | — | — |
| Highly refined oil 2[3)] | 80 | 80 | 80 | 80 | 80 | — | — | 20 | 80 |
| Thickener | | | | | | | | | |
| Lithium soap | — | — | — | — | — | — | — | — | — |
| Lithium complex soap | — | — | — | — | — | — | — | — | — |
| Amide lithium complex soap | 20 | 20 | 20 | 20 | 20 | 18 | 18 | 18 | 20 |
| Octylamine | — | — | — | — | — | — | — | — | — |
| Cyclohexylamine | — | — | — | — | — | — | — | — | — |
| MDI[4)] | — | — | — | — | — | — | — | — | — |
| (Total of components of base grease) | 100 | 100 | 100 | 100 | 100 | 100 | 100 | 100 | 100 |
| Additive | | | | | | | | | |
| Zinc dithiophosphate[5)] | 2 | 2 | 2 | — | 2 | 2 | 2 | 2 | — |
| Polymethacrylate 1[6)] | 1 | — | — | — | — | — | — | — | — |
| Polymethacrylate 2[7)] | — | 0.1 | 7 | 1 | — | 1 | 1 | 1 | — |
| Polymethacrylate 3[8)] | — | — | — | — | — | — | — | — | — |
| TCP[9)] | 1 | 1 | 1 | 1 | 1 | 1 | 1 | 1 | — |
| Kinematic viscosity of base oil (40° C., mm$^2$/s) | 67 | 67 | 67 | 67 | 67 | 68 | 100 | 68 | 67 |
| Mixing worked penetration (JIS K2220) | No. 1 | No. 1 | No. 1 | No. 1 | No. 1 | No. 1 | No. 1 | No. 1 | No. 1 |

TABLE 5-continued

| | | | | | | | | | |
|---|---|---|---|---|---|---|---|---|---|
| oil separation degree (wt %) | 7.2 | 7.5 | 9.8 | 8.6 | 7.3 | 5.9 | 5.6 | 6.3 | 6.9 |
| Fretting test, mg | 6.2 | 5.9 | 6.1 | 7.3 | 6.3 | 5.5 | 5.7 | 5.2 | 21 |

[1] Produced by Showa Shell Sekiyu K.K.: Shell Vitrea Oil 68 (viscosity index: 96, S: not more than 0.58 wt %, P: not more than 0.01 wt %)
[2] Produced by Showa Shell Sekiyu K.K.: Shell Vitrea Oil 100 (viscosity index: 95, S: not more than 0.61 wt %, P: not more than 0.01 wt %)
[3] Produced by Showa Shell Sekiyu K.K.: Shell Hi-Vac Oil X68 (viscosity index: 127, S: not more than 0.01 wt %, P: not more than 0.01 wt %)
[4] Produced by Nippon Polyurethane Industry Co., Ltd.: Millionate MT
[5] Produced by ADEKA CORPORATION: KIKU-LUBE Z112
[6] Produced by Sanyo Chemical Industries Ltd.: ACLUBE 504 (kinematic viscosity at 100° C.: 850 mm$^2$/s)
[7] Produced by Sanyo Chemical Industries Ltd.: ACLUBE 132 (kinematic viscosity at 100° C.: 380 mm$^2$/s)
[8] Produced by Sanyo Chemical Industries Ltd.: ACLUBE 136 (kinematic viscosity at 100° C.: 100 mm$^2$/s)
[9] Tricresyl phosphate The test greases of the comparative example 30, 34, and 38 in which the predetermined polymethacrylate was not added to the base grease was inferior in its fretting resistance performance at low temperatures. The test grease of the comparative example 38 in which the ZnDTP and TCP were not added to the base grease was outstandingly inferior in its fretting resistance performance at low temperatures. The test greases of the comparative examples 31 and 32 in which the predetermined polymethacrylate was added to the base grease out of the predetermined range were also inferior in the fretting resistance performance at low temperatures. In the test grease of the comparative example 33 in which the TCP, the predetermined highly refined oil, and the predetermined polymethacrylate were used but the ZnDTP was not added to the base grease, they were inferior in the fretting resistance performance at low temperatures. In the test greases of the comparative examples 35 through 37 in which the ZnDTP, the TCP, and the predetermined polymethacrylate were added to the base grease, but the base grease did not contain not less than 50 wt % of the predetermined highly refined oil, the test greases were inferior in the fretting resistance performance at low temperatures. In comparison with the test greases of the comparative examples, the test greases of the examples (32 through 42) in which the predetermined highly refined oil and the predetermined thickener were used, and the polymethacrylate, the ZnDTP, and the TCP were added to the base grease had improved oil supply performance and excellent fretting resistance performance at low temperatures.

Industrial Applicability

The highly refined base oil of the present invention has a viscosity index equal to that of synthetic oil. Owing to the addition of the ZnDTP and the polymethacrylate to the base grease, the grease composition of the present invention has a longer life than ordinary mineral oil-based grease at high temperatures. Further the grease composition of the present invention has a much higher performance than the mineral oil at low temperatures. The grease composition of the present invention can be supplied at a much lower cost than a grease composition containing synthetic oil as its base oil. Therefore the grease composition of the present invention can be preferably utilized for rotating equipment and the like in various industries in a wide temperature range from low to high temperatures.

EXPLANATION OF REFERENCE SYMBOLS AND NUMERALS

| | |
|---|---|
| 1: | deep groove ball bearing |
| 2: | inner ring |
| 3: | outer ring |
| 4: | rolling element |
| 5: | cage |
| 6: | sealing member |
| 7: | grease composition |
| 8a, 8b: | opening |
| 11: | hub ring |
| 11a: | inside rolling surface |
| 11b: | small-diameter stepped portion |
| 11c: | caulking portion |
| 11d: | wheel-mounting flange |
| 12: | driving inner ring |
| 12a: | inside rolling surface |
| 13: | outer ring (outer member) |
| 13a: | outside rolling surface |
| 13b: | wheel-mounting flange |
| 14: | rolling element |
| 15: | inner ring (inner member) |
| 16: | hub bearing |
| 17: | sealing member |
| 18: | sealing member |
| 21: | tapered roller bearing |
| 22: | inner ring |
| 23: | outer ring |
| 24: | tapered roller |
| 25: | cage |
| 26: | inner ring spacer |
| 27: | injection hole |
| 28: | axle |
| 31: | roller bearing |
| 32: | inner ring |
| 33: | outer ring |
| 34: | roller |
| 35: | cage |
| 41: | wind power generator |
| 42: | blade |
| 43: | main shaft |
| 44: | nacelle |
| 45: | rolling bearing |
| 46: | speed-up gear |
| 47: | electrical generator |
| 48: | supporting base |
| 49: | motor |
| 50: | reducer |
| 51: | inner ring |
| 52: | outer ring |
| 53: | rolling element |
| 54: | cage |
| 55: | bearing housing |
| 56: | seal |
| 57: | pivotal seat bearing |
| 61: | Rzeppa-type constant-velocity joint |
| 62: | outer member (outer ring) |
| 63: | inner member (inner ring) |
| 64, 65: | track groove |
| 66: | torque transmission member (ball) |
| 67: | cage |
| 68: | shaft |
| 69: | boot |
| 70: | grease composition |

The invention claimed is:

1. A grease composition which exhibits fretting resistance when used in a bearing, comprising base grease consisting of base oil and a thickener, and an additive,
wherein said base oil contains not less than 50 wt % of highly refined oil having a viscosity index of 120 to 180; and said additive contains at least poly(metha)acrylate, zinc dithiophosphate and tricresyl phosphate;
said poly(metha)acrylate has a kinematic viscosity of 100 to 400 mm$^2$/s at 100° C.; and an addition ratio of said poly(metha)acrylate to 100 parts by weight of said base grease is 0.2 to 6 parts by weight.

2. A grease composition which is capable of decreasing fluctuations in rotation resistance when used in a universal joint, comprising base grease consisting of base oil and a thickener, and an additive,
wherein said base oil contains not less than 50 wt % of highly refined oil having a viscosity index of 120 to 180; and said additive contains at least poly(metha)acrylate, zinc dithiophosphate and non-oil soluble molybdenum dithiocarbamate;
said poly(metha)acrylate has a kinematic viscosity of 100 to 400 mm$^2$/s at 100° C.; and an addition ratio of said poly(metha)acrylate to 100 parts by weight of said base grease is 0.2 to 6 parts by weight.

3. A rolling bearing comprising an inner ring, an outer ring, and a plurality of rolling elements interposed between said inner ring and said outer ring, and a grease composition is enclosed in circumferences of said rolling elements, said grease composition is as defined in claim 1.

4. The rolling bearing according to claim 3, which is used as a hub bearing.

5. The rolling bearing according to claim 3, which is used as an axle-supporting rolling bearing for supporting an axle of a rolling stock.

6. The rolling bearing according to claim 3, which is used as a main shaft-supporting rolling bearing for supporting a blade-mounted main shaft in a wind power generator.

7. The rolling bearing according to claim 6, wherein said rolling elements are double-row rollers; an axial raceway surface of said outer ring and axial peripheral surfaces of said rollers are formed as spherical surfaces having an equal radius of curvature; and said peripheral surfaces of said rollers are disposed along said raceway surface of said outer ring.

8. A universal joint, wherein a rotational torque is transmitted by engagement between track grooves and a torque transmission member provided on an outer member and an inner member; an axial movement is made by rolling of said torque transmission member along said track grooves; a grease composition is enclosed in a circumference of said torque transmission member; and said grease composition is as defined in claim 2.

9. The universal joint according to claim 8, which is a constant-velocity joint of a stationary type or a slide type.

10. A rolling bearing comprising an inner ring, an outer ring, and a plurality of rolling elements interposed between said inner ring and said outer ring; and a grease composition is enclosed in circumferences of said rolling elements, said grease composition being as defined in claim 2.

11. The grease composition according to claim 1 or 2, wherein a sulfur content rate of said highly refined oil is less than 0.1 wt %.

12. The grease composition according to claim 1 or 2, wherein a kinematic viscosity of said base oil at 40° C. is 30 to 600 mm$^2$/s.

13. The grease composition according to claim 1 or 2, wherein said thickener is a urea-based compound obtained by a reaction between a polyisocyanate component and a monoamine component; and said monoamine component is at least one monoamine selected from aliphatic monoamines and alicyclic monoamines.

14. The grease composition according to claim 1 or 2, wherein said thickener contains lithium soap, lithium complex soap or amide lithium complex soap having amide bonds in a molecule thereof.

15. The grease composition according to claim 1 or 2, wherein a worked penetration is 200 to 400.

16. The grease composition according to claim 1 or 2, wherein said thickener contains lithium complex soap.

17. The grease composition according to claim 1 or 2, wherein said thickener contains amide lithium complex soap having amide bonds in a molecule thereof.

* * * * *